A. F. THOMPSON.
GAS BURNER.
APPLICATION FILED APR. 2, 1913.
1,099,829.
Patented June 9, 1914.
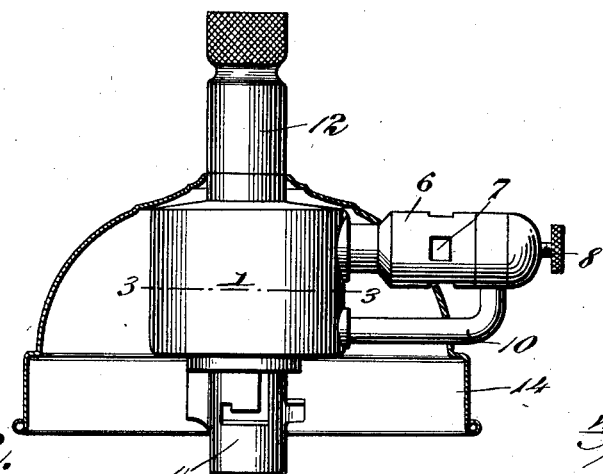
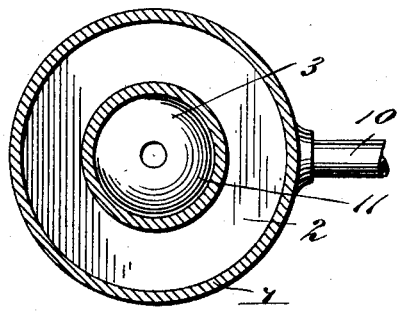
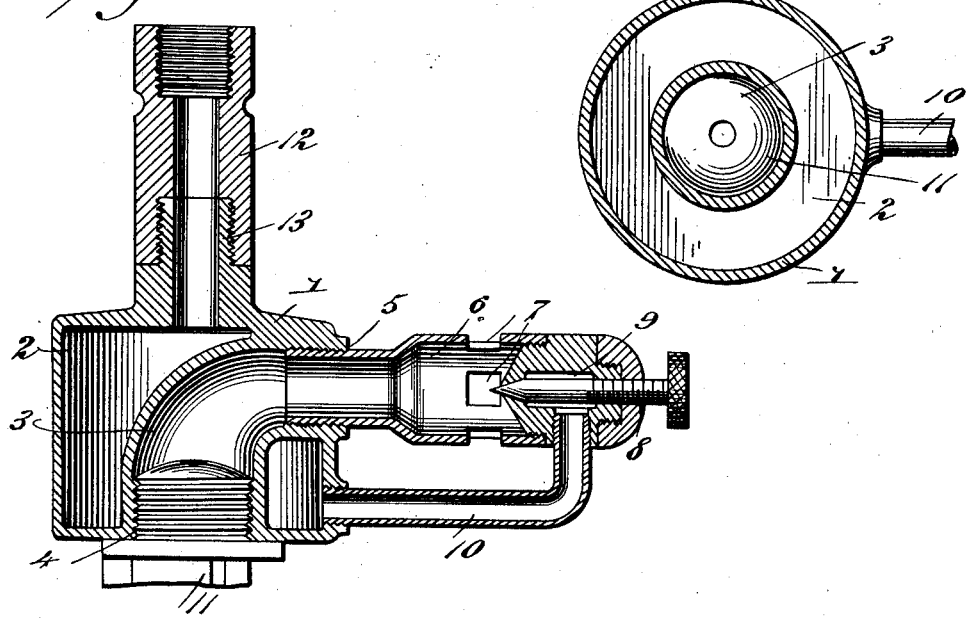
Witnesses
W. S. McDowell
D. W. Gould
Inventor
A. F. Thompson,
By Victor J. Evans
Attorney

UNITED STATES PATENT OFFICE.

AUGUSTUS F. THOMPSON, OF HUNTINGTON, WEST VIRGINIA.

GAS-BURNER.

1,099,829.  Specification of Letters Patent.  Patented June 9, 1914.

Application filed April 2, 1913. Serial No. 758,453.

*To all whom it may concern:*

Be it known that I, AUGUSTUS F. THOMPSON, a citizen of the United States, residing at Huntington, in the county of Cabell and State of West Virginia, have invented new and useful Improvements in Gas-Burners, of which the following is a specification.

The invention relates to an improvement in preheating gas burners and the main object thereof is the provision of a gas burner in which the gas may be thoroughly heated prior to its passage through the mixer for delivery at the point of ignition, the preheating of the gas serving to remove all dampness therefrom and to result in such expanding of the gas and air beyond the mixer as to materially reduce the gas consumption as compared with the present type of device.

The invention in its preferred form of details will be described in the following specification, reference being had particularly to the accompanying drawings, in which:—

Figure 1 is a view in elevation illustrating the improved preheater, the globe holder being shown in section. Fig. 2 is a vertical section through the preheater. Fig. 3 is a section on the line 3—3 of Fig. 1.

Referring particularly to the accompanying drawings the improved preheater comprises a casing 1 which may be of any desired shape in transverse or vertical section and within which is arranged, by suitably forming the interior of the casing, what I term a superheater chamber 2. Also formed within the casing is an approximately L-shaped channel 3 opening through the bottom of the casing at 4 and through one side edge thereof at 5. The channel 3 which is in effect the gas port is by the interior construction of the casing completely closed within the casing against the superheating chamber 2, so that it is impossible for the gas from the chamber 2 to directly reach the port 3. A mixer 6 is connected to the side opening 5 of the port 3 of the casing, said mixer being in the form of a Bunsen burner, having air inlets 7 and a valve 8 for controlling the passage of the gas, as will presently appear, from a chamber 9 to the mixer and the port 3. The chamber 9 of the Bunsen burner is in communication with the superheating chamber 2 by pipe 10 leading into the chamber 9 and into the superheater chamber at a point below the inlet end of the port 3.

The mantle support 11 is of the usual type and is arranged for threaded connection with the outlet end of the port 3, said support having the usual coöperating parts of which no direct description is needed. A connection 12 is secured to the upper portion of the casing preferably through a threaded nipple 13, the connection serving for the attachment of the preheater to the usual supply pipe. The port or passage through the connection 12 and nipple 13 leads directly into the superheater chamber 2, whereby all gas delivered through the supply can reach the point of ignition only from the superheater chamber. Preferably a globe holder 14 is secured in place by the connection 12 above and inclosing a greater portion of the regulator, so that the heat from the mantle will be directed on to the surface of the casing and highly heat the superheater chamber.

From the above description it will be obvious that the heat from the mantle will immediately succeeding the ignition of the gas tend to highly heat the superheater chamber and that as all gas delivered to the mantle must pass through such chamber, such gas will be highly heated prior to its delivery to the mixer, it being obvious that the gas passes from the chamber 2 through the pipe 10, into the chamber 9, past the valve 8, is mixed with air admitted through the openings 7 and passes through the port 3 to the burner. The gas therefore reaches the mixer in highly heated condition with the result that said gas together with the air when mixed therewith is expanded and the consequent reduced consumption of gas insured. Furthermore, the superfluous products in the gas are in so far as it is possible destroyed by the extreme heat delivered to the superheated chamber and hence a purer and more effective lighting product is delivered to the mantle.

What is claimed is:—

A gas burner including a casing adapted for direct communication with the gas supply, said casing including a gas receiving chamber, and a circular shell arranged within the chamber and opening through the bottom and side walls thereof, the interior of the shell being closed against direct communication with the chamber, a Bunsen burner communicating with one end of the shell, and a pipe connection between the chamber and the Bunsen burner.

In testimony whereof I affix my signature in presence of two witnesses.

AUGUSTUS F. THOMPSON.

Witnesses:
CARNEY M. LAYNE,
T. F. EAKMAN.

Copies of this patent may be obtained for five cents each, by addressing the "Commissioner of Patents Washington, D. C."